H. C. EGERTON.
PROCESS OF MOLDING COMPOSITE ARTICLES.
APPLICATION FILED MAY 2, 1919.
1,353,800.
Patented Sept. 21, 1920.
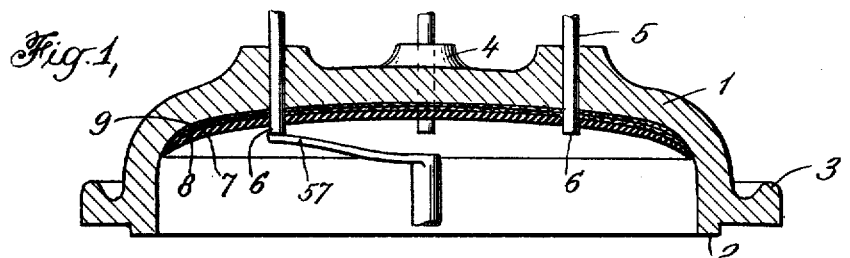
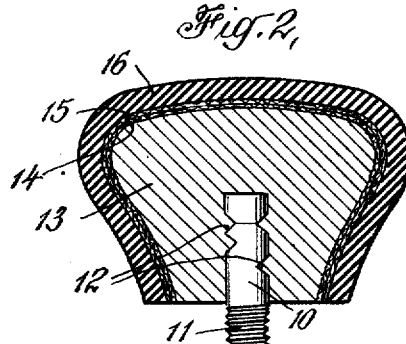
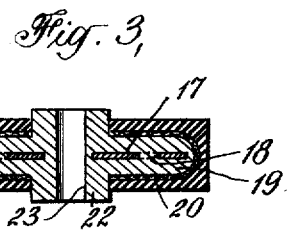
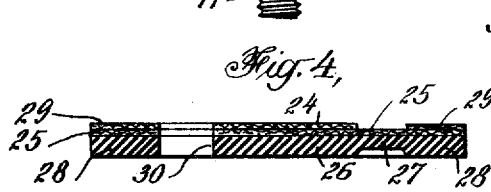
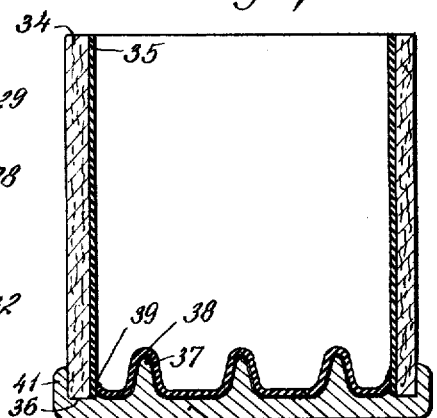
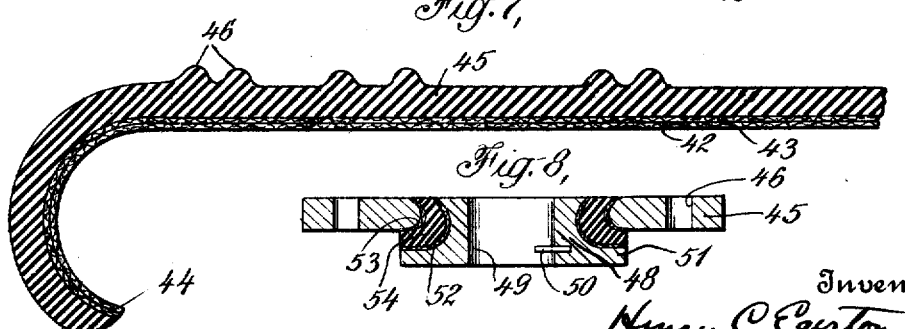
Inventor
Henry C Egerton
By his Attorney
Harry C Duncan

UNITED STATES PATENT OFFICE.

HENRY C. EGERTON, OF RIDGEWOOD, NEW JERSEY.

PROCESS OF MOLDING COMPOSITE ARTICLES.

1,353,800.　　　　Specification of Letters Patent.　　Patented Sept. 21, 1920.

Application filed May 2, 1919. Serial No. 294,315.

*To all whom it may concern:*

Be it known that I, HENRY C. EGERTON, a citizen of the United States, and resident of Ridgewood, county of Bergen, State of New Jersey, have made a certain new and useful Invention Relating to Processes of Molding Composite Articles, of which the following is a specification, taken in connection with the accompanying drawing, which forms part of the same.

This invention relates especially to processes of molding composite articles comprising bakelite or other portions which may include fibrous components or fabric with which is incorporated the phenolic condensation cementing material, such as bakelite, condensite or redmanol varnish compositions, for instance, to which a vulcanized rubber facing or other portion is united or incorporated during the molding operation. For many purposes, such fabric or other fibrous phenolic condensation cementing material elements or portions which may form a stiffened base or body of the completed article may advantageously be cured and more or less molded under pressure to a substantially complete or at least to a considerable extent before the rubber is incorporated therewith or connected thereto through the use of suitable connecting fabric or fibrous material which may advantageously be molded or secured upon the phenolic condensation cementing material, element or body of the article during the molding or forming thereof. In this way ample time and increased heat may, if desired, be used in the curing of the phenolic condensation cementing material employed while the rubber need only be cured sufficiently to effect its vulcanizing molding to the desired shape and simultaneously unite it to the other elements or portions of the article. For some kinds of rubber, especially where high electric insulating or elastic resilient properties are desired, only a moderate vulcanizing heat for a relatively short time is desirable as compared with the heat curing treatment which is desirable to secure the greatest strength and rigidity for supports, casings and other solid articles of bakelite, etc.

In the accompanying drawing showing in a somewhat diagrammatic way a number of illustrative articles or devices which may be made by these processes, Figure 1 is a central section through a gas engine distributer casing.

Fig. 2 is a sectional view through a controller or switch knob or handle.

Figs. 3 to 5 are sectional views through valve or packing members.

Fig. 6 shows in section a battery jar or other container.

Fig. 7 is a sectional view showing a mat or stair tread; and

Fig. 8 shows a yieldable mounting member which may be used for phonograph diaphrams, for example.

The rigid body member of such articles may be formed of any suitable phenolic condensation material, and for many purposes molding compositions containing more or less inert fibrous or other material may be used. As shown in Fig. 1, the rigid body or casing 1 which may be formed of such molding bakelite, condensite or other compositions, may be molded under high pressure and simultaneously cured to the desired strong rigid condition under such heats as 300° to 350° Fahrenheit or more in metal molds in which it may be subjected to the high molding pressures which are desirable, such as a number of thousand pounds per square inch. During this molding operation the electric contacts 6 which may have suitable protruding threaded or other connecting portions 5 extending through the bosses 4 which may be formed on this casing, may be properly positioned within the mold so that the electric contacts 6 protrude to the desired extent within the casing. It is desirable to form the inner face of this casing with a fibrous or fabric connector member 8 of suitable woven or other fabric, such as muslin or canvas so that this material may facilitate the subsequent union of the rubber insulating facing to the inside of the casing around the electric contacts. It is usually advantageous to secure this connector fabric 8 to the casing material by the use of an interposed layer of fabric or fibrous material, such as cloth, paper, cotton batting, or the like, carrying and preferably impregnated with phenolic condensation cementing material, such as 40 to 60 per cent. of dried bakelite varnish. In the molding of the casing these two layers of fabric may be positioned on the convex mold member and the electric contacts 6 inserted or positioned in holes in these fabrics before the mold is closed and forced home to highly compress the charge of molding composition which is thus formed and cured under pressure into the desired rigid condition and such elements as the locating flange 2 and connector loop 3 formed thereon. The heat and duration of this curing process is preferably such as to effect the complete or substantially complete curing of the material, although the heat should not of course be so high as to injure the fabric or other fibrous connecting material employed. Thereafter the rubber insulating facing or portion 7 may be secured in position by placing or spreading a layer of suitable vulcanizable rubber composition in place on the connector fabric 8 which may in some cases be advantageously coated with a rubber cementing composition and dried to facilitate union with the rubber. Then the article may be compressed in another vulcanizing mold at relatively lower heat or for a shorter time which is ample when the usual accelerated rubber compositions are used to secure sufficient vulcanizing union to effectively unite such an insulating rubber facing to the body of the article and vulcanize it to a sufficient extent to secure the best electric insulating properties which might be injured by such a prolonged curing as would be necessary for the complete curing of phenolic condensation molding compositions of this character. The distributer arm 57 which may be used to co-operate with these electric contacts 6 is shown slightly out of contact therewith as in certain types of gas engine distributers of this general character. In this way no undesirable rubbing contact need take place between the distributer arm and the contacts and the valuable insulating properties of the rubber facing are not thereby impaired.

Fig. 2 shows another article such as a switch or regulator knob or handle which may be of any suitable shape and which may effectively be made in this way, a connecting pin 10 having such annular or other recesses as 12, and a threaded projecting end 11, if desired, may be molded within a mass or body of molding phenolic condensation composition such as molding bakelite or condensite and a connecting fabric, such as 15, may be simultaneously united to the outside of this rigid body 13 during the molding thereof by placing such a layer of woven or knit fabric or the like within the mold and also preferably placing inside the same another layer of coated or impregnated fabric 14 carrying considerable proportions of bakelite varnish, for instance, before the molding composition body 13 is forced home together with the connecting pin in the molding press. After the body has been completely or substantially cured it may have united thereto an insulating and gripping facing layer 16 of vulcanized rubber composition of any suitable character and this may be effected at moderate heats at which ample union may be secured with the other elements without undesirably hardening, carbonizing or otherwise injuring the insulating or elastic properties of the material.

Various valve or packing members or devices may advantageously be formed in this way and as shown in Fig. 3 a valve member which may be used for various purposes may comprise a body 19 of molding bakelite or the like in which, if desired, a metallic reinforcing member 17 may be incorporated so that the molding composition is securely united to the metal reinforcement which may be provided with suitable holes 18. During the molding a connector fabric 20 may be secured to this rigid body of the article which may of course be formed with projecting hubs or portions 22 having a guide hole 23 therein for some purposes. This fabric 22 may be a double layer of fabric as previously described or in some cases it may comprise only a single layer of knit or woven fabric or the like which may be uncoated or in some cases lightly coated on the side next the molding composition with a coating of dried bakelite varnish or the like which may advantageously be partially cured to prevent penetration during the molding of the rigid body material. After such molding the facing 21 of vulcanized rubber or other suitable plastic molding compositions such as gutta percha, balata, celluloid, etc., may be united thereto by pressure molding methods. Where valves are desired which have specially elastic properties relatively pure vulcanizable rubber compositions may be used in this way and molded under pressure at moderate heat for a sufficient time to unite and vulcanize them in place in connection with the previously partly or completely cured body consisting of or comprising phenolic condensation cementing material. Fig. 4 shows another form of valve, such as may be used, for a flap pump valve in which the central portion may have a stiffening backing member 24 comprising one of more layers or sheets of fabric carrying or impregnated with phenolic condensation cementing material and cured under pressure to secure a relatively rigid strong backing or body. A more or less annular stiffening member 29 may be similarly formed of one or more layers of fabric or cotton batting, paper or other material carrying or impregnated with such phenolic condensation cementing material. It is advantageous during the molding of these stiffening or reinforcing backing members to unite thereto a relatively uncoated connector fabric 25 which may extend over the faces of these backing members and preferably also extend over the yieldable flap portion 27 of the valve. After such curing molding operation the rubber or other plastic facing 26 of the central valve body may be united to one or both sides of the backing or reinforcing members and connector fabric secured thereto by a heat pressure molding operation, and if desired a similar rubberized facing 28 may be united to the outer annular supporting portion of the valve where it serves as a desirable packing member to insure tight closure at this point, it being, of course, understood that the free edge 30 of the central valve member rises to open the valve, the yieldable portion or connecting flap 27 bending during this action. Fig. 5 shows a generally similar valve or packing member which may comprise a reinforcing or stiffening backing or supporting portion 31 composed of one or more layers of cloth or other fabric containing such cured phenolic condensation cementing material which may be cured under pressure at the desired heat and also simultaneously united to a connecting fabric 32. The vulcanized rubber or other plastic facing 33 may be subsequently united by heating under pressure which may effect the desired vulcanizing of the rubber composition and form a composite sheet of such material which is highly desirable for use as packing for water, steam and other purposes, or for forming valves, washers or the like by suitable cutting or punching out the desired size pieces.

Fig. 6 shows a container such as a jar for a storage or other battery or electrolytic cell which may be conveniently made in this general way, the body 34 of the container being formed, if desired, of rectangular or other sectioned tube having one or more layers of suitable fibrous material, such as paper or cloth, or a single layer of cotton batting or other fiber carrying or impregnated with phenolic condensation cementing material which has been compressed and simultaneously molded by internal pressure under such heat as may substantially or completely cure the incorporated phenolic condensation cementing material. For some purposes internal fluid pressure may be used in such molding operations and a rubberized facing 35 may be simultaneously united to the inside of the tubular body 34 and vulcanized thereto or to an interposed connector fabric during the pressure molding operation. A suitable length of such a tubular body may be cut off and a bottom member 40 of suitable fibrous or other phenolic condensation cementing material may be molded and united thereto under the desired heat and pressure. For this purpose a mass of molding bakelite containing fibrous material may, for instance, be used and molded in a suitable mold in which the side member 34 is located, a sheet or layer of connector fabric 37 being inserted in the mold and forced into such depressions as seem desirable to form supporting members in the bottom of the completed cell. This pressure molding of course forces the molding bakelite around the lower edge 36 of the side member and may also in some cases form an inclosing connecting flange 41 outside the same so as to secure more effective union. A suitable facing layer of rubber 38 may either be molded simultaneously with this bottom member 40 or subsequently thereto, in which case it may be applied to the connector fabric 37 to which rubber cement may be previously applied, if desired, and then the whole united under pressure in any suitable vulcanizing mold or chamber.

Fig. 7 shows another article, such as a mat, support, lining member or the like, which may be made in this way. The stiffened backing or support 42 may comprise one or more layers of fabric or fibrous material carrying such phenolic condensation cementing material and this may be previously molded, if desired, and simultaneously united to a fabric or other connector layer 43, these members being given such form as is desired to suit the particular use of the facing lining or supporting member which is being formed. Thereafter in another mold the vulcanized rubber or other facing 45 may be simultaneously vulcanized and secured to this stiffened backing portion of the article by a lower vulcanizing heat, if desired, and this molding process may, of course, give any desired form and thickness to this rubber facing and may form gripping projections such as 46 thereon.

Fig. 8 shows another illustrative type of articles which may be made by these processes. This mounting or connecting device may comprise a connecting member or collar 48 which may be molded of molding bakelite or condensite compositions so as to have embedded therein or connected thereto in connection with an internal metallic lining ring, if desired, one or more pins, such as 50 which may engage a bayonet slot or other connection in a coöperating member, such as a phonograph tone arm which would fit within the hole 49 in this connecting collar. A flange 51 may be formed on this connecting collar which may have a more or less outwardly flaring portion or flange on its opposite side so as to more securely engage the yieldable rubber or other material which may be connected thereto so as to yieldingly unite it to the supporting plate or member which may form the other element of this device. This supporting plate 45 may have any desired form and size and may be formed of or comprise moldable phenolic condensation cementing material which may be molded under heat and pressure so as to give the desired shape to this part and form therein any connecting holes or portions, such as 46. This molding process may also be utilized to unite to the connecting and supporting member suitable connecting fabrics, such as 52, 53, which may be placed in the molds in which these members are formed and intimately and strongly united thereto during the pressure molding processes. Thereafter these two members may be resiliently united by an interposed yieldable uniting member 54 of suitable vulcanized rubber composition, for instance, which may be molded under heat and pressure in the mold in which the other co-operating members are accurately positioned or located and the closing of one of the mold members may then force the vulcanizable rubber uniting member 54 between the co-operating surfaces of these rigid members or elements so that the rubber may be vulcanized to the desired extent and simultaneously strongly and intimately incorporated with the connecting fabrics by the moderate vulcanizing heat which may be used. This makes a very desirable arrangement for mounting phonograph sound boxes and for this purpose a relatively pure vulcanizable rubber composition may advantageously be used so as to give a considerable degree of elastic yielding action between these two rigid members 48, 55, the latter of which may be suitably shaped so as to constitute one face of the sound box when the diaphragm ring or support preferably of relatively heavy rigid construction is screwed or otherwise united thereto. Of course in some cases still greater flexibility may be secured by using special rubber compositions for yieldingly uniting such rigid supporting elements or members and by the use of sponge rubber compositions a still greater degree of elastic yielding action may be secured so that the diaphragm and sound box may be free to follow the vibratory or other movements imparted thereto. It is of course understood that the supporting member 45 may in some cases be molded with annular recesses or portions to accommodate the diaphragm supporting rings or members so as to still further eliminate parts and simplify the sound box.

This invention has been described in connection with a number of illustrative embodiments, articles, forms, proportions, materials, arrangements, compositions, temperatures, times, pressures and treatments, to the details of which disclosure the invention is not of course to be limited, since what is claimed as new and what is desired to be secured by Letters Patent is set forth in the appended claims:

1. The process of molding composite articles which comprises simultaneously molding and uniting by heat and pressure a substantially rigid reinforcing portion comprising moldable phenolic condensation composition, a fabric layer carrying and impregnated by condensation cementing material and a fabric connector member having an exposed fibrous surface and having its other surface engaged by and united to said impregnated fabric and in subsequently molding and simultaneously uniting to said connector fabric member a facing of yieldable vulcanized rubber by a reduced heat curing treatment.

2. The process of molding composite articles which comprises simultaneously molding and uniting by heat and pressure a reinforcing portion comprising fabric carrying phenolic condensation cementing material and a fabric connector member having an exposed fibrous surface and having its other surface engaged by and united to said impregnated fabric and in subsequently molding and simultaneously uniting to said connector fabric member a facing of yieldable vulcanized rubber by a reduced heat curing treatment.

3. The process of molding composite articles which comprises simultaneously molding and uniting by heat and pressure a reinforcing portion comprising fabric carrying phenolic condensation cementing material and a fabric connector member having an exposed fibrous surface and having its other surface engaged by and united to said impregnated fabric and in subsequently molding and uniting to said connector fabric member a facing of vulcanized rubber.

4. The process of molding composite articles which comprises molding and uniting by heat and pressure a substantially rigid reinforcing portion comprising phenolic condensation cementing material and a fabric connector member having one surface engaged by such phenolic condensation cementing material uniting said fabric to said reinforcing portion, until the heat effects at least the substantially complete moderate curing of such phenolic condensation cementing material, and subsequently molding and simultaneously uniting to said connector fabric a facing of yieldable vulcanized rubber by relatively moderate heat vulcanizing treatment.

5. The process of molding composite articles which comprises molding and uniting by heat and pressure a substantially rigid reinforcing portion comprising phenolic condensation cementing material and a fabric connector member having one surface engaged by such phenolic condensation cementing material, until the heat effects at least the moderate curing of such phenolic condensation cementing material, and subsequently molding and simultaneously uniting to said connector fabric a facing of vulcanized rubber by relatively moderate heat vulcanizing treatment.

6. The process of molding composite articles which comprises molding and uniting by heat and pressure a reinforcing portion comprising phenolic condensation cementing material and a fibrous connector member having one surface engaged by such phenolic condensation cementing material, until the heat effects at least the moderate curing of such phenolic condensation cementing material, and subsequently molding and simultaneously uniting to said connector fabric a facing of vulcanized rubber.

7. The process of molding composite articles which comprises molding and uniting by heat and pressure a reinforcing portion comprising fibrous material and incorporated phenolic condensation cementing material and a fabric connector member having one surface engaged by such phenolic condensation cementing material and at least effecting substantial curing of such phenolic condensation cementing material, and subsequently molding and simultaneously uniting to said connector fabric a facing portion of relatively pure yieldable vulcanized rubber by relatively moderate heat curing treatment.

8. The process of molding composite articles which comprises molding and uniting by heat a reinforcing portion comprising fibrous material and incorporated phenolic condensation cementing material and a fabric connector member engaged by phenolic condensation cementing material and at least effect substantial curing of such phenolic condensation cementing material, and subsequently molding and uniting to said connector fabric a facing portion of relatively pure yieldable vulcanized rubber by relatively moderate heat curing treatment.

9. The process of molding composite articles which comprises molding and uniting by heat a reinforcing portion comprising fabric material and incorporated phenolic condensation cementing material and a fabric connector member engaged by phenolic condensation cementing material and at least effecting substantial curing of such phenolic condensation cementing material, and subsequently molding and uniting to said connector fabric a facing portion of vulcanized rubber by relatively moderate heat curing treatment.

10. The process of molding composite articles which comprises molding and uniting by heat a reinforcing portion comprising fabric material and incorporated phenolic condensation cementing material and a fabric connector member engaged by phenolic condensation cementing material and at least effecting substantial curing of such phenolic condensation cementing material, and susequently molding and uniting to said connector fabric a portion of different plastic insulating material.

11. The process of molding composite articles which comprises molding by heat and pressure a substantially rigid reinforcing portion comprising incorporated phenolic condensation cementing material and a fibrous connector member until the heat effects at least the moderate curing of such phenolic condensation cementing material and subsequently molding and simultaneously uniting to said connector member a facing portion of yieldable vulcanized rubber by relatively moderate heat curing treatment.

12. The process of molding composite articles which comprises molding by heat and pressure a substantially rigid reinforcing portion comprising incorporated phenolic condensation cementing material and a fibrous connector member and subsequently uniting to said connector member a facing portion of vulcanized rubber.

HENRY C. EGERTON.